United States Patent Office 3,444,256
Patented May 13, 1969

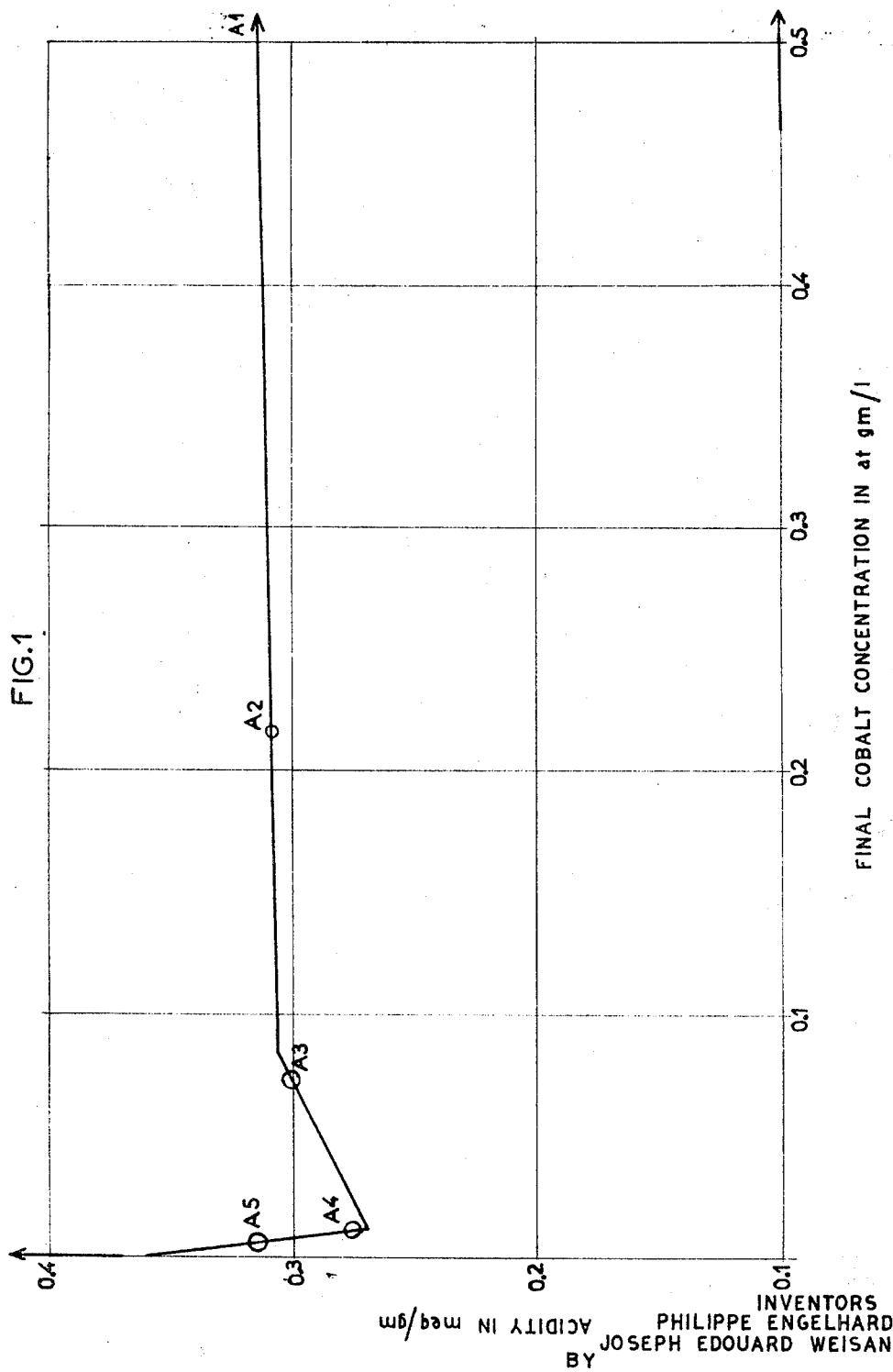

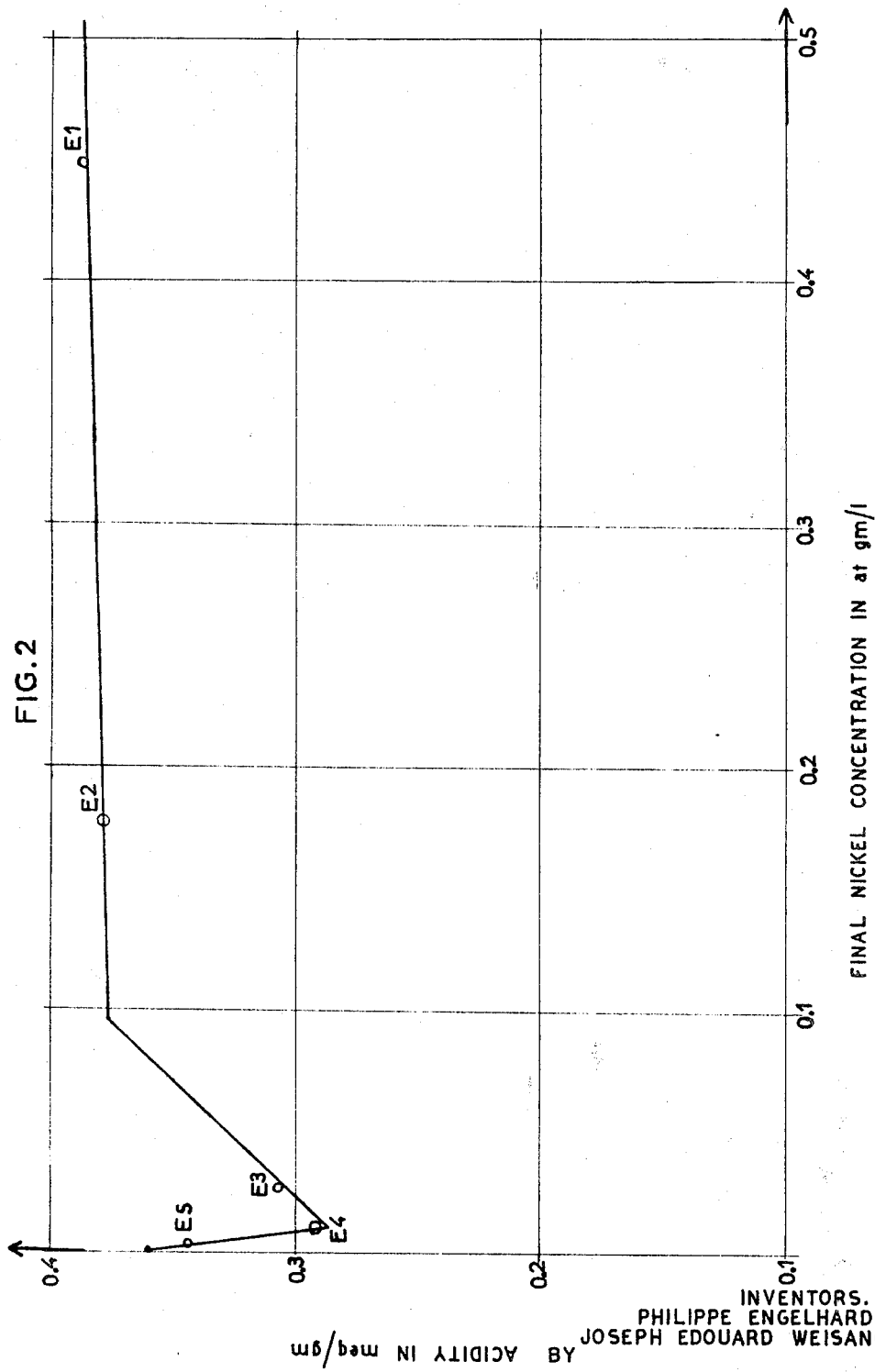

3,444,256
SELECTIVE HYDROGENATION WITH MINIMUM ACIDITY CATALYST
Philippe A. Engelhard, 52 Ave. Foch, Le Havre, Seine-Maritime, France, and Joseph Edouard Weisang, 15 Rue du Docteur Suriray, Le Havre, Seine-Maritime, France
Filed Feb. 13, 1967, Ser. No. 615,612
Claims priority, application France, Feb. 18, 1966, 50,262; Jan. 6, 1967, 90,298; Jan. 31, 1967, 93,090
Int. Cl. C23c *3/04;* C07c *11/02*
U.S. Cl. 260—677
14 Claims

ABSTRACT OF THE DISCLOSURE

Metals from the group calcium, chromium, cobalt, copper, iron, nickel, and zinc, deposited on aluminum oxide as a support for the catalyst metal and in a quantity so that the resulting surface acidity is as close as possible to the minimum, provide unexpectedly enhanced selectivity for the direct catalytic hydrogenation of small or even trace portions of acetylenic and di-olefinic compounds contained in hydrocarbon mixtures which are predominantly mono-olefinic without hydrogenating the mono-olefinic hydrocarbons.

This invention relates to the direct and selective catalytic hydrogenation of hydrocarbons more unsaturated than olefins in mixtures with olefins and, more particularly, to methods and metal catalyst compositions of such high selectivity that only such more unsaturated hydrocarbons are hydrogenated without hydrogenating the olefins and even when such more unsaturated hydrocarbons are present in the olefin mixture in only small or even merely trace concentrations.

As is well understood in this art, it is especially important, with olefin mixtures destined to be used in polymerization reactions, to remove as completely as possible impurities or components of the olefin mixtures comprising hydrocarbons which are more unsaturated than olefins because such more unsaturated hydrocarbons may have an inhibiting tendency in catalytic polymerization reactions, even in concentrations as little as of the order 5 p.p.m. or less. Reference to hydrocarbons more unsaturated than olefins, as used herein, is meant to include those having at least one triple bond between carbon atoms (such as acetylenic hydrocarbons) and those which have at least two double bonds between carbon atoms (such as di-olefins, tri-olefins, etc.), whether aliphatic or cyclic.

It is known to attempt adequate purification of such olefin mixtures and the removal therefrom of even trace portions of more unsaturated hydrocarbons by fractional distillation into very narrow cuts and then removing the more unsaturated hydrocarbons from each fraction by solvent extraction. In many, if not most, instances, however, better or more practical results are achieved by directly hydrogenating the more unsaturated hydrocarbons while still in the olefin mixture, but while avoiding hydrogenation of the mono-olefins themselves. In such a situation, it is highly important to operate with a hydrogenation catalyst of extremely high selectivity in order to hydrogenate the more unsaturated hydrocarbons (even when they are present in only trace amounts) without hydrogenating or saturating the mono-olefins which are the desired end product.

Thus, a number of more or less selective catalysts are available for industrial use from among the various metals having hydrogenation catalyst properties. Among these, for example, may be noted molybdenum and cobalt deposited on an alumina support, nickel and copper alone or admixed with other metals, and noble metals such as platinum or palladium. With such known catalysts, however, the desired or optimum selectivity for the particular uses to which this invention relates can be approached only with difficulty and/or requires special measures for increasing the spatial velocity, controlling or preventing the poisoning of the catalyst activity by sulphur or water vapor, or controlling or limiting the hydrogen content of the reactant charge. Another example of a catalyst of high selectivity for the purposes of interest here may be noted in co-pending application S.N. 461,188, filed June 3, 1965, in which is disclosed a catalyst formed of a mixture of chromium and nickel materials deposited on a refractory oxide support, with enhanced results being achieved by an extremely uniform deposition of the catalyst metals on the adsorption surface of the support.

According to the present invention, a further enhancement in the selectivity of metal hydrogenation catalysts for use in eliminating more unsaturated hydrocarbons from mono-olefin mixtures is achieved and a variety of metal catalyst materials are provided, as well as methods for the production and activation thereof with greater economy and simplicity than those required for metal catalysts previously used. As described in more detail below, illustrative metals for forming the catalyst materials in accordance herewith include calcium, chromium, cobalt, copper, iron, nickel, zinc, and mixtures thereof, deposited on an alumina support, with the most optimum and preferred high selectivity results being achieved by controlling the concentration of metal on or impregnated into the alumina support so that the acidity of the surface thereof approaches as nearly as possible minimum acidity.

With the foregoing and additional objects in view, this invention will be described in more detail, and other objects and advantages thereof will be apparent from the following description, the accompanying drawings, and the appended claims.

In the drawings:

FIGS. 1 and 2 are graphic representations of data in which the selectivity of various catalysts in accordance herewith are indicated in terms of the acidity of the surface of the support with the catalyst metal thereon plotted against final concentration of catalyst metal in the impregnating solution and where the catalyst metals are, respectively, cobalt and nickel (concentration in gram-atoms of metal).

In the course of the developments leading to this invention and in attempting to produce catalysts of greater selectivity than previously known or those which were at least as selective but considerably easier and cheaper to prepare in industrial scale quantities, it has been discovered that catalysts comprising such metals as nickel and/or cobalt impregnated into or on a porous refractory oxide support (such as alumina) provide excellent hydrogenation selectivity when the content of the nickel and/or cobalt on the support is within the range of about 0.002–0.2 mg./m.$^2$ of the adsorption surface (as defined below) and with the metal uniformly deposited over all the adsorption surface. If the quantity of catalyst metal exceeds substantially 0.2 mg./m.² on the adsorption surface, it has been found that, while all the acetylenic hydrocarbons in the olefin mixture may be hydrogenated, hydrogenation of mono-olefins also occurs to a significant or undesirable extent. Similarly, if the distribution of the catalyst metal over the adsorption surface is not as uniform as possible, the presence of deposits of catalysts where the concentration of the metal is larger produces some hydrogenation at those particular points and tends to saturate some of the mono-olefins to the corresponding paraffinic hydrocarbons in a manner which, of course, is not desired.

Such desired conditions are readily obtained, as noted in more detail below, by impregnating the alumina support with a solution of a soluble salt of nickel and/or cobalt in which the metal concentration is not substantially above 40 gm./l., with the duration of impregnation being regulated to give the desired quantity of metal deposited uniformly over the adsorption surfaces of the support.

In connection herewith, it is to be understood that the phrase "adsorption surface" is intended to mean the actual active surface per gram of the porous catalyst support, determined by the procedure of Brunauer, Emmet and Teller (B.E.T.); that is to say by measuring the quantity of nitrogen adsorbed at $-195°$ C. on the support previously degasified at $+250°$ C. for two hours and at a pressure of $10^{-5}$ mm. Hg or less, and by considering that the surface occupied by a nitrogen molecule in a liquid state is about 16.2 Å².

In the further development of this invention, it has been discovered that the quantity of metal deposited on an alumina support by impregnation from a solution of a soluble salt varies with the concentration of the metal in the solution, but, for the same concentration, the quantity of metal actually fixed to the support varies with the surface of the support and the duration of the impregnation. All conditions being otherwise equal, the quantity of metal deposited per unit surface appears to be solely a function of the final concentration of metal (or metal salt) in the solution with which the support is being impregnated.

Similarly, if the acidity of the surface of the solid catalyst support after impregnation (being measured), for example, by chemisorption of ammonia in known manner) be plotted against the final concentration of the impregnating solution, the results show, quite surprisingly and in a completely unexpected manner, that the acidity decreases in the range of weak concentrations and attains a distinct minimum, after which, according to the particular metal being considered, the acidity may remain constant or increase before becoming stabilzed at a level where it appears not to vary substantially with further increase of concentration of the catalyst metal in the impregnated solution (as indicated graphically in FIGS. 1 and 2, described in more detail below).

Also, it has been discovered in connection herewith and in a manner which is completely unexpected, that the catalysts which are the most selective for hydrogenating hydrocarbons more unsaturated than mono-olefins in mixtures containing primarily or predominantly mono-olefin materials are those which have minimum acidity, after impregnation of the metal catalyst material on to the support, or an acidity as close as possible to such minimum, and when the impregnation of the support with the catalyst metal occurs at a temperature not substantially above 40° C. Thus, the catalyst materials of greatest preference in accordance herewith, and the preparation and use thereof, conform to the several general qualifications noted above in order to obtain the greatest selectivity and optimum results, in the highly selective hydrogenation of hydrocarbons which are more unsaturated than the mono-olefins in mixtures where the mono-olefinic content predominates.

Although the actual chemical mechanism or complete explanation for the phenomena noted in accordance herewith may not be thoroughly understood with completeness, useful hypothesis may be suggested. Thus, one can consider the surface of the alumina support as composed of certain sites active in an acidic sense and other sites active in a basic sense, with the minimum acidity value corresponding to the adsorption of a quantity of catalyst metal just sufficient to neutralize the acidic sites on the surface of the support. If one considers that, with respect to the surface of the support, hydrocarbons more unsaturated than the mono-olefins act as acids, while the mono-olefins act as bases, then one can suggest that only the hydrocarbons more unsaturated than the mono-olefins are adsorbed or held on the basic sites on the catalyst surface and will react with hydrogen flowing thereover, while the mono-olefins are not so adsorbed (or only so adsorbed to a minor degree) and, thus, do not react with the hydrogen stream during the hydrogenation step or reaction.

Following such hypothesis and confirming such suggestions with actual trials, it has been discovered in accordance herewith that, in addition to the metals nickel and cobalt and/or mixtures thereof, such metals as calcium, chromium, copper, iron, zinc, and/or mixtures thereof also produce satisfactory results as catalyst materials for the hydrogenation reactions to which this invention relates and when deposited on or impregnated into alumina supports as described below and in a manner to produce on the support a minimum acidity or an acidity as close to the minimum as can be conveniently obtained within the limits of providing a simple and inexpensive technique for producing the catalyst materials in the first place. In addition to such metals (which are here noted as primarily illustrative but not limiting), one may note that satisfactory results are obtained in accordance herewith utilizing a wide variety of alumina support materials, but it is preferred in most instances to utilize those porous alumina materials in which the adsorption surface is greater than about 15 m.²/gm. and in which the porous volume is greater than about 0.1 cm.³/gm. Considering the usual or conventionally obtained porous alumina materials, in which the adsorption surface is generally within the range of about 150–350 m.²/gm., the proportion of catalyst metal for obtaining the desired minimum acidity is generally within the range of about $3.0 \times 10^{-2}$ to $15.0 \times 10^{-2}$ millimoles/gram.

As will be understood, the actual quantity of catalyst metal adsorbed on the surface of the alumina support depends upon the concentration of the impregnating solution of metal salt in equilibrium with the impregnated alumina solid. Naturally, after a certain duration of impregnation, the concentration of the impregnating solution and the content of metal on the solid no longer vary. Thus, satisfactory results are achieved in producing the catalyst materials in accordance herewith by impregnating the alumina support with a solution of a compound of the desired metal having a concentration such that the final concentration will be in equilibrium with the impregnated solid at the desired minimum degree of acidity or, as close thereto as desired.

Given a concentration of solution of a particular catalyst metal salt in equilibrium with the impregnated solid support having the desired minimum acidity, the catalyst materials in accordance herewith are readily prepared, according to one technique, by plunging or immersing the alumina support in a solution of a compound of the desired catalyst metal or metals in which the concentration of metal is above the equilibrium concentration and in which the volume of solution is such that, after impregnation of the solid with the necessary quantity of solution for neutralization thereof, a final concentration is reached in the impregnating solution more or less equal to the equilibrium concentration. In such a case, the initial concentration of the solution, prior to impregnation, is preferably selected in the neighborhood of the equilibrium concentration, and the alumina support is preferably immersed or subjected to a large excess volume of the metal salt solution. Such a technique has the advantage of enhancing the uniformity of adsorption of the metal on the adsorption surface of the alumina and, consequently, enhancing the uniformity of distribution of the catalyst metal over the alumina support.

Alternatively, the alumina support is readily impregnated in accordance herewith by using a solution in which the concentration of metal salt is substantially equal to the equilibrium concentration with the impregnated solid at the point of minimum acidity, and by maintaining such solution at a substantially constant concentration by continuously or intermittently replenishing it with the soluble metallic compound. Where an equilibrium is established between the impregnated solid and the impregnating solution, the alumina will have adsorbed the necessary quantity of catalyst metal to neutralize the various acidic sites in the desired manner and to obtain the desired minimum or near-minimum acidity.

Still another alternative method of impregnation of the alumina support is to subject it to immersion in the solvent of the metal compound impregnating solution and to add thereto progressively a concentrated solution of the desired metal compound in order to attain, at the end of the impregnation step, a concentration and equilibrium with the impregnated solid at the desired minimum or near-minimum acidity level. In any event, for impregnating alumina materials in which the adsorption surface is within the range of about 150–350 m.$^2$/gm., satisfactory results are generally obtained in accordance herewith utilizing metal salt solutions in which the concentration of catalyst metal is within the range of about 3–50 millimoles of metal per liter of metal salt solution.

The preferred duration of the impregnating step is that which is necessary to produce the desired equilibrium of distribution of the metal between the impregnating solution and the solid alumina support. As will be understood, within reasonable limits, it is possible to use an impregnating solution somewhat more concentrated than that theoretically necessary in order to reduce the time for complete impregnation and without impairing the selectivity of the catalyst material produced. In most instances, however, the satisfactory time for impregnation varies generally from about 10–24 hours.

After impregnation, the composite solid catalyst (i.e., catalyst metal or metals impregnated on the porous alumina support) is dried in known manner and calcined. Generally satisfactory results are obtained in accordance herewith when the drying temperature is within the range of about 95°–130° C. and the calcining temperature is generally between the decomposition temperature of the metal compound which has been impregnated into the alumina support and about 825° C. In most instances, a calcining temperature within the range of about 550°–650° C. provides satisfactory results in accordance herewith. With catalyst materials produced in accordance herewith, it is generally not necessary to subject the catalyst to a separate activating step prior to use, as with many hydrogenation catalysts as previously known, so that one of the advantages of this invention is to avoid the necessity of having to reduce the catalyst material at high temperature in hydrogen or other reducing atmosphere after preparation of the catalyst material and prior to use thereof in a hydrogenation reaction.

Although the most desirable and optimum results are obtained in accordance herewith by utilizing porous alumina as a support for the catalyst here (and in any of a variety of conveniently obtainable forms such as balls, granules, tablets, powders, etc.), other refractory oxides are usable as solid supports for metal dehydrogenation catalysts. Similarly, although the optimum results here relate to impregnating the support to an extent of minimum or near-minimum acidity, a certain more or less high selectivity of metal catalysts may be achieved even departing somewhat from such minimum acidity. In any event, and as particularly illustrative with the metals nickel and/or cobalt, the deposition of catalyst metal (or mixtures of metals) on the solid support should not substantially exceed 0.2 mg./m.$^2$ on the adsorption surface, within the limits of attempting to obtain minimal acidity, after which the selectivity of the catalyst diminishes notably. Nevertheless, if the quantity of metal on the support is substantially less than 0.002 mg./m$^2$, some prolongation of hydrogenation reaction may be required to achieve complete hydrogenation of the hydrocarbons present in the mixture and more unsaturated than the mono-olefins. As generally illustrative, the range of metals deposited on the adsorption surface is preferably between 0.008 and 0.13 mg./m.$^2$, particularly for nickel and cobalt, and as qualified by the goal of obtaining minimum or near-minimum acidity in the finished catalyst product.

Satisfactory results are achieved utilizing a variety of soluble inorganic or organic salts of the disclosed catalyst metals for impregnating the solid support in aqueous or organic solvent solutions (such as alchols or ethers). Generally the particular salt is one where decomposition occurs on the support at less than the 825° C. maximum desired calcining temperature noted above and where the salt (or the anion thereof) neither reacts with nor attaches to nor alters the acidity of the surface of the alumina support. Within these qualifications satisfactory results are achieved with such inorganic salts as the soluble nitrates and carbonates and such organic salts as oxalates, acetates, formates, etc.; while the sulphates generally have too high a decomposition temperature and the chlorides (and other halides) have an acidifying effect on the alumina surface. Although, as noted above, the concentration of the impregnating solution is a ready means of controlling the quantity of metal deposited on the support, generally the concentration should not exceed 40 gm./l. (in terms of catalyst metal) where impregnation is achieved merely by imersion of the support. Simlarly, concentration less than about 0.3 gm./l., especially with metals such as nickel and/or cobalt, may unnecessarily extend the time of immersion to produce the desired deposition or adsorption of catalyst metal on the support.

Although the time for obtaining appropriate impregnation varies generally within the range set forth above and in accordance with the acidity level desired, the temperature during the impregnating step may vary widely up to perhaps 90° C., and is conveniently maintained within the range of about 10°–40° C. Although catalyst materials in accordance herewith do not generally require an activation treatment after preparation thereof and prior to use, as with many hydrogenation catalysts previously used, if it is desired to include such pretreatment or activation, satisfactory results are achieved in accordance herewith by subjecting the dried and calcined catalyst material with the metal impregnated therein to a current of hydrogen-containing gas for a period of from about 1–20 hours, and preferably within the range of 3–15 hours, at a temperature within the range of 100°–650° C., and preferably within the range of 200°–450° C.

In the utilization of hydrogenation catalyst materials in accordance herewith for the selective hydrogenation of hydrocarbons more unsaturated than mono-olefins in mixtures therewith but without hydrogenating the mono-olefins, even when the more unsaturated hydrocarbons are present in merely trace amounts, the entire hydrogenation reaction is conducted in gaseous phase, as will be understood. Such reaction is particularly applicable to olefinic charges containing 1–4 carbon atoms per molecule, and the catalysts in accordance herewith provide satisfactory results in treating such olefin mixtures in but a single pass in a conventional hydrogenation reactor, with a substantially complete elimination of hydrocarbons more unsaturated than the mono-olefins making up the bulk of the charge. Such hydrogenation reactions are satisfactorily accomplished at temperatures within the range of about 100°–300° C., at pressures within the range of about 5–70 atms., and with gaseous hydrocarbon charges interjected into the reactor at space velocities within the range of about 500–6,000 volumes of charge per volume of catalyst per hour (v./v./h.).

As further illustrative, but not limiting, of this invention and commercial operating conditions and materials with which satisfactory results have been achieved in accordance herewith, one may note the following detailed examples and the data developed therefrom:

EXAMPLE I

Alumina was used as the catalyst support in the form of small balls being 2–5 mm. in diameter and having a specific surface of about 235 m.²/gm. (measured by the B.E.T. method noted above). The acidity of this alumina was about 0.360 milliequivalent (meq.) per gram (measured by chemisorption of ammonia at 175° C. following the method described by Webb in Industrial and Engineering Chemistry, (1957) 49, 261–3). Using such alumina material as the solid catalyst support, five different catalyst materials were prepared (designated in the following data and tables as catalysts A1 through A5) by immersing the alumina at room temperature during about 16 hours in various solutions of cobalt nitrate in which the concentration varied from about 0.5 gm./l. to 35 gm./l. of metallic cobalt. Each batch of catalyst material was then dried at 110° C. and calcined for 8 hours at 600° C. in a muffle furnace.

Thereafter, various runs were made under commercial operating conditions using each of these five batches of catalyst material in selective hydrogenation reactions (particularly for the selective hydrogenation of acetylene) in a starting material charge having the following composition: nitrogen 40 vol. percent, hydrogen 15 vol. percent, ethylene 45 vol. percent, and acetylene 3,000 p.p.m., using a conventional hydrogenation reactor and noting data and results at various operating temperatures and space velocities as reported in the following Table I. The quantity of non-hydrogenated acetylene was measured in the effluent gases leaving the reactor by means of reaction of the acetylene on silver nitrate to give silver acetylide, and the other components of the reactor effluent were analyzed in gaseous phase by chromatography, all in known and conventional manner.

The various pertinent data from these runs are compiled in Table I set forth below, including the initial and final cobalt concentrations of the catalyst impregnating solutions, the cobalt content on each of the various catalysts, the acidity after impregnation, the results obtained in the different operating conditions during the hydrogenation reaction, and the degree of selectivity of the several catalysts. This last selectivity factor (noted in the table as S in per cent) was calculated according to the following equation:

$$S = 100 - \frac{\text{percent } H_2 \text{ used to hydrogenate ethylene}}{\text{percent acetylene transformed}} \times 100$$

Referring to FIG. 1 of the appended drawings, there is shown a graphic representation of these data where the acidity of the various catalysts A1–A5, determined for different values of final concentration of metallic cobalt in the impregnating solution of cobalt nitrate (i.e., after impregnation).

TABLE I

| | Preparation of Catalyst | | | | | | | Hydrogenation Runs (at 8 atms.) | | | | | |
|---|---|---|---|---|---|---|---|---|---|---|---|---|---|
| | Concentration | | | | | | | Temperature, ° C. | | | | | |
| | Initial | | Final | | | | | 150 | | | 250 | | |
| | | | | | Co, | Acidity, | | Charge (v./v./h.) | | | | | |
| Catalyst | G./l. | Atg./l. | A./l. | Atg./l. | percent | meq./g. | Catalyst | 1,000 | 2,000 | 3,000 | 1,000 | 2,000 | 3,000 |
| A1 | 35 | 0.593 | 33.85 | 0.574 | 3 | 0.322 | C₂H₂, p.p.m. / C₂H₆, percent / S, percent | 0 / 18.1 / 0 | 0 / 8.4 / 38 | 144 / 4.8 / 72 | 0 / 13.0 / 21 | 0 / 8.6 / 52 | 0 / 4.3 / 70 |
| A2 | 13.5 | 0.229 | 12.7 | 0.215 | 1.5 | 0.310 | C₂H₂, p.p.m. / C₂H₆, percent / S, percent | 0 / 16.5 / 0 | 0 / 2.7 / 77 | 468 / tr. / 96.5 | 0 / 8.6 / 55 | 0 / 3.3 / 68 | 0 / 1.6 / 87 |
| A3 | 5 | 0.085 | 4.23 | 0.072 | 1.0 | 0.302 | C₂H₂, p.p.m. / C₂H₆, percent / S, percent | 0 / 7.6 / 58 | 780 / tr. / 95 | 2,670 / 0 / 100 | 0 / 6.6 / 71 | 0 / 3.0 / 84 | 0 / 1.1 / 92 |
| A4 | 1 | 0.017 | 0.69 | 0.011 | 0.35 | 0.275 | C₂H₂, p.p.m. / C₂H₆, percent / S, percent | 0 / 2.9 / 87 | 885 / 0 / 100 | 1,308 / 0 / 100 | 0 / 1.9 / 91 | 0 / tr. / 97 | 0 / tr. / 100 |
| A5 | 0.5 | 0.008 | 0.33 | 0.0056 | 0.19 | 0.324 | C₂H₂, p.p.m. / C₂H₆, percent / S, percent | 0 / 5.3 / 81 | 570 / tr. / 96 | 1,750 / 0 / 100 | 0 / 4.0 / 83 | 0 / 2.1 / 92 | 0 / tr. / 100 |

As indicated by the data in Table I and FIG. 1, catalyst A4, which is the closest approaching the minimum acidity of the several catalysts tried, as the final concentration of cobalt was varied in equilibrium of the alumina being impregnated, produced the greatest selectivity in the hydrogenation of the acetylene contained in the above noted charge of this example.

EXAMPLE II

A kilo of a catalyst B, like catalyst A4 above, was prepared by immersing 1,000 gms. of the same alumina material as in Example I for 16 hours at room temperature in 10 liters of a solution of cobalt nitrate containing 1 gm. of metallic cobalt per liter, that is to say 16.9 millimoles of cobalt per liter. After drying and calcining as indicated above, 200 gms. of the catalyst material thus prepared was used to hydrogenate the acetylene contained in a charge having the following composition:

| Constituent | Percent Vol. | Percent Weight |
|---|---|---|
| Hydrogen | 12.83 | 1.07 |
| Methane | 29.81 | 19.91 |
| Ethane | 6.14 | 7.69 |
| Ethylene | 31.44 | 36.76 |
| Propane | 0.81 | 1.49 |
| Propylene | 18.23 | 31.97 |
| $CO_2$ | 0.01 | 0.02 |
| Butanes | traces | traces |
| Acetylene | 0.32 | 0.35 |
| Butene-1 | 0.02 | 0.05 |
| Isobutene | 0.05 | 0.12 |
| Butadiene | 0.03 | 0.07 |
| Propadiene | 0.11 | 0.18 |
| Propane | 0.18 | 0.30 |
| Cyclopropane | traces | traces |
| CO | 0.02 | 0.02 |

The satisfactory selectivity of this catalyst material is apparent from the data compiled in Table II below, in the various runs indicated (which lasted up to 1,430 hours) at various pressures in the reactor and at various space velocities of charge throughput, the temperature being constant throughout the various runs at about 260° C. These data emphasize that catalyst materials in accordance herewith—even when used under widely varying charge throughput and reaction time conditions for production runs of long duration without catalyst replacement—produce and maintain a high degree of selectivity for the hydrogenation of acetylene as compared with the hydrogenation of ethylene, and are considerably superior to known commercial or industrial hydrogenation catalysts to an extent which produces substantial economic advantages because of the increase in non-hydrogenated ethylene remaining in the hydrocarbon mixture after hydrogenation of the more unsaturated components thereof.

containing 80 gms. of cobalt per liter. At the end of the 16 hours, the final concentration of this solution in equilibrium with the solid was about 0.81 gm. cobalt per liter (i.e. about 13.8 millimoles per liter), and the resulting alumina contained about 0.50% by weight of cobalt and had an acidity of about 0.288 meq./gm. which is an acidity in the neighborhood of the minimum possible.

After drying and calcination, as described for the material of Example I, catalyst D was utilized in the selective hydrogenation of acetylene contained in the industrial charge of Example III, under reaction conditions such that the temperature was about 250° C., the length of the run was about 15 hours, the pressure was about 8 atms., and the space velocity was about 2,000 v./v./h. Whereas the acetylene in the original charge was completely hydrogenated so that none could be found in the

TABLE II

| Pressure (atms.) | 10 | | | 8 | 12 | 10 | | |
|---|---|---|---|---|---|---|---|---|
| Length of Run (hrs.) | 0–27 | 27–186.5 | 186.5–1,000 | 1,000–1,130 | 1,130–1,250 | 1,250–1,330 | 1,330–1,390 | 1,390–1,430 |
| Charge (v./v./h.) | 2,000 | 2,500 | 3,000 | 3,000 | 3,000 | 3,500 | 4,000 | 4,500 |
| Selectivity, percent [1] | | mean 92.6 [2] | | 93.4 | 89.7 | 89.7 | 91.4 | [3] 94.3 |

[1] Selectivity S is calculated according to the following formula:
Ec=ethane/ethylene by weight in the charge.
S=100 Ec/Ep (1+Ac) in which Ep=ethane/ethylene by weight in the effluent.
Ac=acetylene/ethylene by weight in the charge.
[2] The same trial with a commercial catalyst showed a mean selectivity of 74.8%.
[3] At 4,500 v./v./h. and at this temperature, from 20 to 30 p.p.m. of acetylene remained not hydrogenated.

EXAMPLE III

An additional variety of catalyst material was prepared utilizing the second method of impregnation described above. Thus, two kilos of alumina in the form of balls having 2–5 mm. diameters, a specific surface of 210 m.$^2$/gm., and an acidity of 0.350 meq./gm., were immersed in 3.85 liters of a solution of cobalt nitrate having 1 gm. of metallic cobalt per liter. The solution was circulated over the alumina, and the concentration was adjusted by adding more concentrated solution of cobalt nitrate. At the end of the impregnation step, the final concentration of the solution in equilibrium with the solid was 0.7 gm./l. (i.e., about 12 millimoles of cobalt per liter). After drying and calcining as described above, the catalyst material contained about 0.34% by weight of cobalt, and the acidity thereof was 0.282 meq./gm., near the minimum acidity. This catalyst was used in hydrogenating the hydrocarbons more unsaturated than mono-olefins in a charge substantially like that utilized above with Example II and having an ethane/ethylene weight ratio of about 0.204, and the resulting data are compiled in Table III below, for runs at 250° C. with space velocities about 3,000 v./v./h.

TABLE III

| Length of Run (hrs.) | Acetylene in Effluent, p.p.m. | Ethane/Ethylene in Effluent (Instantaneous) | Ethylene Loss as percent Ethylene in charge |
|---|---|---|---|
| 1 | 0 | 0.221 | 1.4 |
| 2.25 | 0 | 0.226 | 1.8 |
| 4.5 | 0 | 0.220 | 1.3 |
| 5.75 | 0 | 0.215 | 0.9 |
| 7 | 0 | 0.223 | 1.5 |
| 7.5 | 0 | 0.211 | 0.7 |

EXAMPLE IV

A further catalyst material D was prepared following the third impregnating technique described above. Thus, 100 gms. of the same alumina material as in Example III was immersed in about 200 cc. distilled water to which was continuously added over a period of about 16 hours 7.5 cc. of a very concentrated solution of cobalt nitrate effluent from the reactor, the total loss of ethylene determined was only 0.8% of the ethylene contained originally in the charge prior to hydrogenation.

As will be apparent from reviewing the data and description of the foregoing, for example, regardless of the particular method of impregnating the catalyst metal on the alumina support, extremely selective catalyst materials are obtained in accordance herewith if the final concentration of the impregnating solution in equilibrium with the solid is such that there is produced on the solid a minimum acidity, as indicated, more particularly, by the data plotted on FIG. 1.

EXAMPLE V

Starting with alumina material as described for Example I, and following the first impregnation technique described above, five catalysts were prepared (E1 through E5) utilizing nickel instead of cobalt. To this end, the alumina balls were submerged for about 16 hours in five solutions of nickel nitrate having different concentrations. After drying at 110° C. and calcining at 600° C. in a muffle furnace, each of these five catalysts was used for the selective hydrogenation of the acetylene contained in a hydrocarbon charge having the composition given for that of Example I. The data regarding the impregnation conditions, the hydrogenation reaction conditions, and the results obtained are compiled in Table IV set forth below. Also, on FIG. 2, there are plotted these data in terms of the acidity of the catalyst plotted against different values of the final nickel concentration in the impregnating solution of nickel nitrate, and indicating that catalyst E4 was closest to the actual minimum acidity value.

As is apparent from the data compiled in Table IV, in the case of nickel as the catalyst metal, as previously described regarding cobalt, it is the particular catalyst material closest to minimum acidity on the alumina support which is the most selective in the hydrogenation of acetylene while avoiding the hydrogenation of ethylene, and such minimum acidity concentration is readily determined merely by varying the final concentration of the catalyst metal in the solution used for impregnating the alumina support.

TABLE I

| Catalyst | Preparation of Catalyst | | | | | | | Hydrogenation Runs (at 8 atms.) | | | | | |
|---|---|---|---|---|---|---|---|---|---|---|---|---|---|
| | Concentration | | | | Co, percent | Acidity, meq/g. | Catalyst | Temperature, °C. | | | | | |
| | Initial | | Final | | | | | 150 | | | 250 | | |
| | | | | | | | | Charge (v./v./h.) | | | | | |
| | G./l. | Atg./l. | A./l. | Atg./l. | | | | 1,000 | 2,000 | 3,000 | 1,000 | 2,000 | 3,000 |
| E1 | 27.5 | 0.466 | 26.43 | 0.448 | 2.68 | 0.388 | $C_2H_2$, p.p.m. $C_2H_6$, percent S, percent | 0<br>21.4<br>0 | 0<br>13.9<br>21 | 0<br>13.1<br>20 | 0<br>22.1<br>0 | 0<br>12.2<br>21 | 0<br>8.6<br>54 |
| E2 | 10.5 | 0.178 | 9.68 | 0.164 | 1.45 | 0.378 | $C_2H_2$, p.p.m. $C_2H_6$, percent S, percent | 0<br>12.8<br>7 | 0<br>11.6<br>23 | 0<br>8.6<br>52.3 | 0<br>15.1<br>6 | 0<br>8.4<br>40 | 0<br>7<br>57 |
| E3 | 2.15 | 0.0364 | 1.56 | 0.0264 | 0.75 | 0.307 | $C_2H_2$, p.p.m. $C_2H_6$, percent S, percent | 0<br>3.5<br>82 | 84<br>tr.<br>97 | 570<br>0<br>100 | 0<br>3.3<br>80 | 0<br>2.1<br>85 | 0<br>0.9<br>95 |
| E4 | 0.9 | 0.0152 | 0.58 | 0.0098 | 0.44 | 0.291 | $C_2H_2$, p.p.m. $C_2H_6$, percent S, percent | 0<br>1.8<br>90 | 253<br>1.2<br>92.5 | 1,200<br>0<br>100 | 0<br>4.9<br>72 | 0<br>1.6<br>71 | 0<br>0<br>100 |
| E5 | 0.5 | 0.0085 | 0.22 | 0.0037 | 0.31 | 0.344 | $C_2H_2$, p.p.m. $C_2H_6$, percent S, percent | 96<br>1.0<br>94 | 852<br>0<br>97 | 1,560<br>0<br>100 | 0<br>5.2<br>74 | 0<br>1.3<br>91 | 0<br>tr.<br>97 |

EXAMPLE VI

A further nickel catalyst was prepared following the third method of impregnating alumina noted above, that is to say by submerging 100 gm. of alumina balls (of the same variety as those used in Example III) in 200 cc. distilled water, to which was continuously added over 16 hours a concentrated solution of nickel nitrate at room temperature. There resulted a final nickel concentration in the impregnating solution of 0.8 gm. nickel per liter (i.e., about 13.5 millimoles per liter), which is a concentration in the neighborhood of that equilibrium with the solid at minimum acidity. The retained nickel was about 0.59% by weight on the solid, and the acidity measured about 0.272 meq./gm.

After drying and calcining as described in the other examples above, this catalyst material was used for the selective hydrogenation of the acetylene contained in a charge having substantially the same composition as that used in Example I. The reaction conditions were: temperature 250° C., pressure 8 atms., space velocity 2,000 v./v./h. The results of this hydrogenation reaction are indicated by the data compiled in Table V set forth below.

TABLE V

| Length of Run (hrs.) | P.p.m. Acetylene in Effluent (Instantaneous) | Wt. percent Ethane in Effluent (Instantaneous) |
|---|---|---|
| 1 | 0 | 1.5 |
| 3.75 | 0 | 1.6 |
| 6.25 | 0 | 1.9 |
| 8.5 | 0 | 1.1 |
| 11 | 0 | 1.6 |

EXAMPLE VII

Following the first impregnating technique described above, a copper catalyst was prepared in accordance herewith by submerging alumina balls (the same which were described in connection with Example III) in an excess of solution of copper nitrate The final concentration of the solution in equilibrium with the solid, after 16 hours of impregnation, was about 0.51 gm. copper per liter (i.e., about 8 millimole per liter). The retained copper on the catalyst obtained was about 0.61% by weight, and the acidity was about 0.251 meq./gm., an acidity very close to the minimum acidity which one can obtain by varying the final concentration of a solution in equilibrium with the solid.

After drying and calcining, this catalyst material was utilized for the selective hydrogenation of the acetylene contained in a charge of hydrocarbons having a composition substantially that given in connection with Example II. This hydrogenation reaction was conducted at about 250° C. at 8 atms. and with a space velocity of 3,000 v./v./h. About 9½ hours after beginning the trial, no trace of acetylene was to be found in the effluent flow from the reactor, and the ethane/ethylene ratio by weight in the effluent product and the ethylene losses expressed in percent of ethylene in the original charge are given in the following table:

TABLE VI

| Length of Run (hrs.) | Ethane/ Ethylene Ratio in Charge (Instantaneous) | Ethylene Loss in percent |
|---|---|---|
| 9.5 | 0.248 | 3.0 |
| 11.25 | 0.244 | 2.7 |
| 14.25 | 0.237 | 2.2 |
| 16.25 | 0.228 | 1.5 |
| 18.25 | 0.226 | 1.3 |
| 21.5 | 0.226 | 1.3 |
| 23 | 0.212 | ca. 0.5 |

As is apparent from the foregoing data, a copper catalyst, prepared in accordance with this invention, also produces satisfactory results, at least ultimately, and notwithstanding that it may permit a certain minor ethylene loss in the first hours of a continuous commercial run, with apparently constantly increasing selectivity for acetylene hydrogenation, and, in any event, complete acetylene removal as desired.

EXAMPLE VIII

A further catalyst containing zinc was prepared in accordance herewith and following the third method of impregnation discussed above. Thus, 100 gm. of alumina in the form of balls (as used in Example III) were submerged in 200 cc. distilled water, to which was added continuously over 16 hours a concentrated solution of zinc nitrate. The final concentration of the solution in equilibrium with the solid was about 0.34 gm. of zinc per liter (i.e., 5.34 millimoles per liter), and the finished catalyst contained about 0.46% by weight of zinc, with an acidity of about 0.286 meq./gm., thus quite neat the minimum which one can obtain by varying the final concentration of the impregnating solution.

After drying and calcining, this catalyst was utilized for the selective hydrogenation of the acetylene contained in the same charge as noted for Example I, with the reaction temperature being about 250° C., the pressure about 8 atms., and the space velocity about 2,000 v./v./h. The results of these trials are indicated by the data compiled in the following table, with the selectivity factor being calculated as indicated in connection with Example I above. In all instances no unhydrogenated acetylene was noted in the effluent from these runs.

TABLE VII

| Length of Run (hrs.) | Ethane in Effluent (Instantaneous) | Selectivity S |
|---|---|---|
| 1.75 | 0.4 | 97.3 |
| 4.25 | 0.6 | 96 |
| 6.25 | 0.9 | 94 |
| 7.75 | 0.5 | 96.7 |
| 10.25 | 1 | 93.4 |
| 12.75 | 1.2 | 92 |

EXAMPLE IX

A further catalyst was prepared in accordance herewith, using iron as the catalyst metal, by immersing alumina balls (the same as utilized with Example I) in a solution of ferric nitrate the final concentration of which in equilibrium with the solid was about 0.04 gm. iron per liter (i.e., about 0.71 millimole per liter). The catalyst contained, after impregnation, about 0.54% by weight of iron, and the acidity was about 0.320 meq./gm.

After drying and calcining, this catalyst was utilized for the selective hydrogenation of the acetylene contained in a charge having the composition given in Example I. The reaction conditions were: temperature 250° C., pressure 8 atms., space velocity 2,000 v./v./h. The results of these runs showed that there was no acetylene remaining unhydrogenated in the effluent from the reactor and that the mean formation of ethane over several hours of operation was only 1.1% by weight of the effluent product.

EXAMPLE X

A further catalyst in accordance herewith was prepared utilizing chromium as the catalyst metal and following the first method of impregnation described above. That is, balls of alumina (the same as those used for Example I) were immersed in a solution of chromium nitrate at room temperature, and the final concenration of the impregnating solution stabilized at about 0.545 gm. chromium per liter (i.e., about 10.5 millimoles per liter). The acidity of the catalyst material thus obtained was about 0.278 meq./gm., that is very close to the minimum acidity observed by varying the final concentration of the impregnating solution over fairly wide ranges.

After drying and calcining, this catalyst was utilized for the selective hydrogenation of the acetylene contained in a charge of hydrocarbons having the composition given for Example I, and the hydrogenation was conducted at 250° C., 8 atms., and with a space velocity of about 2,000 v./v./h. The results of these trials are indicated by the data compiled in the following Table VIII.

TABLE VIII

| Length of Run (hrs.) | Acetylene in Effluent, p.p.m. | Ethane formed as percent of Effluent |
|---|---|---|
| 1 | 0 | 1.3 |
| 3.25 | 4 | 1.3 |
| 5.75 | 2 | 1.3 |
| 7.75 | 12 | 0.5 |
| 9.5 | 13 | 0.6 |
| 12.5 | 18 | 0.7 |

Although the above data may not indicate results as highly optimum and unexpectedly advantageous as some of the other catalysts discussed in accordance herewith, the reduction of the original ethylene content of about 3,000 p.p.m. down to only a few p.p.m., coupled with the very minor amounts of undesired ethylene hydrogenation, indicates that this chromium catalyst is definitely advantageous, although the usable life thereof in continuous operation over a long period of time may not be as great as some of the other catalyst materials described herein.

EXAMPLE XI

A further catalyst in accordance herewith was prepared utilizing calcium as the catalyst metal and following the first method of impregnation described above. That is, 50 gm. balls of alumina of the same characteristics as to specific surface and surface acidity as those utilized in Example III above were immersed in 500 cc. of a solution of calcium nitrate having 0.98 gm. calcium per liter for 16 hours at room temperature. After the immersion, the concentration of the immersing solution in equilibrium with the solid alumina was about 0.77 gm. calcium per liter or about 0.0192 atom-grams calcium per liter.

After drying the solid at 110° C. and calcining at 500° C., a catalyst material was obtained containing about 0.24% by weight calcium and with a surface acidity of about 0.241 meq./gm., that is, substantially the minimum acidity that can be obtained by varying the final concentration of the impregnating solution. Such catalyst material was utilized for the selective hydrogenation of the acetylene contained in a charge of hydrocarbons having the composition given for Example I, and the hydrogenation was conducted at a temperature of 250° C., a pressure of 8 atms., and a space velocity of about 2,000 v./v./h. The results of these trials are indicated in the following Table IX:

TABLE IX

| Length of run (hrs.) | 2.25 | 4.5 | 6.5 | 8.5 | 10.5 |
|---|---|---|---|---|---|
| Instantaneous Measurement: | | | | | |
| Ethane formed (percent vol.) | 1.3 | 1 | 1.1 | 0.9 | 0.8 |
| Acetylene remaining (p.p.m.) | 0 | 0 | 0 | 0 | 0 |

As is apparent from the foregoing data, catalyst materials in accordance herewith and comprising alumina impregnated with calcium at a concentration to give near-minimum surface acidity provide the desired high degree of selectivity in the hydrogenation of hydrocarbons more unsaturated than olefins; even when such more unsaturated hydrocarbons are present in very minor proportions in a mono-olefin mixture.

As will be apparent from all the foregoing, there are provided in accordance with this invention metal catalyst materials and methods for the production and utilization thereof for enhanced results as selective hydrogenation catalysts, and under circumstances where the selectivity can be controlled to a sufficiently high degree for hydrogenating even trace amounts of hydrocarbons more unsaturated than mono-olefins and admixed therewith without also hydrogenating the mono-olefins. Such results are achieved with efficiencies and high selectivity at least as great or greater than any of the high selectivity acetylenic hydrogenation catalysts previously known, and with catalyst materials the manufacture of which is considerably more simplified and/or economical than the previously known hydrogenation catalysts.

Furthermore, impregnating techniques are described whereby a particular quantity of retained metal catalyst is impregnated on an alumina support, merely by allowing an impregnating solution of controlled concentration to come into equilibrium with the supporting solid immersed therein, so that a controlled concentration of catalyst is achieved for optimum results, which concentration is primarily to be considered as that which provides a minimum or near-minimum acidity on the surface of the catalyst support after impregnation thereof has been completed. Selecting the particular concentration of impregnating solution to achieve this end is readily accomplished in accordance herewith by simple trials of varying concentrations of the particular metal salt solution on the particular support desired and to measure the initial and final concentrations of the impregnating solution and the impregnated results, in order to note the concentration which approaches the minimum acidity level at which greatest selectivity is achieved. Furthermore, the teachings and developments hereof eliminate the necessity, with previously known catalyst materials, of activating the catalyst prior to use by a preliminary reducing reaction, and largely eliminate other difficulties with sulphur poisoning of the catalyst and other disadvantages of conventional techniques.

What is claimed is:

1. A hydrogenation catalyst composition of the character described and being highly selective for the direct catalytic hydrogenation of hydrocarbons more unsaturated than mono-olefins while admixed with mono-olefins and without saturating said mono-olefins, which consists essentially of a solid porous alumina support on which is deposited a metal selected from the group consisting of calcium, chromium, cobalt, copper, iron, nickel, zinc, and mixtures thereof, said metal being deposited on said support in a quantity such that the surface acidity of said support with said metal deposited thereon approaches the minimum acidity achievable by deposition of said metal on said support at a temperature not substantially greater than about 40° C.

2. A catalyst material as recited in claim 1 in which said surface acidity of said support with said metal deposited thereon is substantially said minimum acidity.

3. A catalyst material as recited in claim 1 in which said alumina support has a specific surface greater than about 15 m.$^2$/gm. and a porous volume greater than about 0.1 cc./gm.

4. A catalyst material as recited in claim 3 in which the specific surface of said alumina support is within the range of about 150–350 m.$^2$/gm.

5. A catalyst material as recited in claim 1 in which the quantity of said metal deposited on said alumina support is substantially within the range of about $3.0 \times 10^{-2}$ to $15.0 \times 10^{-2}$ millimoles of metal per gram of alumina.

6. In a method for the preparation of a highly selective catalyst of the character described for the direct catalytic hydrogenation of hydrocarbons more unsaturated than mono-olefins while admixed with mono-olefins without also hydrogenating said mono-olefins, the steps which comprise in combination immersing a solid and porous alumina support for said catalyst in a solution of a salt consisting essentially of a catalyst metal selected from the group consisting of calcium, chromium, cobalt, copper, iron, nickel, zinc, and mixtures thereof, maintaining said alumina support immersed in said solution for adsorption and impregnation with said metal salt until equilibrium is reached between the concentration of said metal salt in said solution and the concentration of said metal salt adsorbed and impregnated into said alumina support, the concentration of said metal salt in said solution being such that said equilibrium is reached upon the impregnation and adsorption of a quantity of said metal salt on said alumina providing a surface acidity of said alumina support approaching the minimum surface acidity achievable by impregnating and adsorbing said salt on said alumina at a temperature substantially no greater than about 40° C., removing said alumina with said salt deposited thereon from said solution, drying said alumina with said metal salt thereon, and calcining said alumina for decomposing said salt and leaving said metal thereof on said alumina, said calcining step being at a temperature above the decomposition temperature of said metal salt and a temperature less than about 825° C.

7. A method as recited in claim 6 in which the concentration of said metal salt in said solution prior to immersion of said alumina therein is greater than said equilibrium concentration and in which the volume of said solution in which said alumina support is immersed in such that said equilibrium conditions between said salt deposited on said alumina support and the final concentrations of said salt in said solution are reached at a concentration of said salt deposited on said alumina support approaching said minimum acidity of the surface of said support.

8. A method as recited in claim 6 in which the initial concentration of said metal salt in said solution prior to immersing said alumina support therein is substantially within the concentration range to produce minimum surface acidity on said alumina after impregnation of said salt, and in which said alumina is immersed in a large excess of said solution at said concentration.

9. A method as recited in claim 6 in which the concentration of said metal salt in said solution in which said alumina is immersed is initially substantially less than the concentration of said metal salt desired on said alumina support and in which said metal salt is added to said solution while said alumina support is immersed therein for increasing said metal salt concentration in said solution up to the concentration providing minimum acidity on said support when said metal salt thereon is in equilibrium with that in said solution.

10. A method as recited in claim 6 in which the initial concentration of said metal salt in said solution is within the range of about 3–50 millimoles of metal per liter of solution.

11. A method as recited in claim 6 in which said immersion of said support in said solution is continued a time within the range of about 10–24 hours.

12. A method as recited in claim 6 in which said drying of said alumina support with said metal salt thereon is effected at a temperature within the range of about 95°–130° C.

13. A method as recited in claim 6 in which said calcining of said alumina with said metal salt thereon and said decomposiiton of said metal salt is effected at a temperature within the range of about 550°–650° C.

14. In a method for the selective direct catalytic hydrogenation of hydrocarbons more unsaturated than mono-olefins and contained as minor constituents in hydrocarbon mixtures which are predominantly mono-olefinic without hydrogenating said mono-olefinic components of said mixtures, the steps which comprise in combination introducing said hydrocarbon mixtures along with a hydrogen-containing gas in a reaction zone for said selective hydrogenation thereof, providing in said hydrogenation zone a catalyst consisting essentially of a porous alumina support having deposited thereon a hydrogenation catalyst metal selected from the group consisting of calcium, chromium, cobalt, copper, iron, nickel, zinc, and mixtures thereof the quantity of said catalyst metal on said alumina support being such as provides a surface activity approaching the minimum surface acidity of said support with said metal deposited thereon at a temperature not substantially greater than 40° C., and maintaining the reaction conditions within said hydrogenation zone substantially within the range of about 100°–300° C. temperature, 5–70 atms. pressure, and 500–6,000 v./v./h. space velocity of the hydrocarbon mixture charge.

References Cited

UNITED STATES PATENTS

| 2,331,292 | 10/1943 | Archibald et al. | 252—463 |
| 3,068,303 | 12/1962 | Pattison | 260—677 |
| 3,076,858 | 2/1963 | Frevel et al. | 260—677 |
| 3,284,370 | 11/1966 | Clifford et al. | 252—466 |
| 3,353,910 | 11/1967 | Cornelius et al. | 252—463 |
| 3,367,741 | 2/1968 | Notari et al. | 252—463 |

HERBERT LEVINE, *Primary Examiner.*

U.S. Cl. X.R.

208—143; 252—463, 465, 466